United States Patent [19]

Lyons, Jr.

[11] 4,196,638
[45] Apr. 8, 1980

[54] TRACTION-DRIVE TRANSMISSION

[75] Inventor: Thomas F. Lyons, Jr., Plantsville, Conn.

[73] Assignee: Textron Inc., Providence, R.I.

[21] Appl. No.: 927,991

[22] Filed: Jul. 26, 1978

[51] Int. Cl.² .................. F16H 15/08; F16H 37/06
[52] U.S. Cl. ........................ 74/200; 74/191; 74/213; 74/690
[58] Field of Search ............ 74/200, 690, 691, 190, 74/191, 192, 202, 207, 211, 213

[56] References Cited

U.S. PATENT DOCUMENTS

| 878,954 | 2/1908 | Holsman | 74/207 X |
| 941,856 | 11/1909 | Chisholm | 74/191 |
| 2,560,180 | 7/1951 | Lesueur | 74/200 |
| 2,818,751 | 1/1958 | Jorgensen | 74/690 |
| 3,299,743 | 1/1967 | Stockton | 74/690 |
| 3,793,910 | 2/1974 | Nasvytis | 74/690 X |
| 4,098,145 | 7/1978 | Dickinson | 74/191 X |
| 4,098,146 | 7/1978 | McLarty | 74/200 X |

FOREIGN PATENT DOCUMENTS

| 375126 | 5/1923 | Fed. Rep. of Germany | 192/70 |
| 391883 | 3/1924 | Fed. Rep. of Germany | 192/70 |
| 534407 | 1/1922 | France | 74/200 |
| 104627 | 5/1924 | Switzerland | 74/690 |
| 215209 | 5/1924 | United Kingdom | 74/690 |
| 539892 | 9/1941 | United Kingdom | 74/191 |

Primary Examiner—Leslie Braun
Attorney, Agent, or Firm—Hopgood, Calimafde, Kalil, Blaustein & Lieberman

[57] ABSTRACT

The invention contemplates an improved traction-drive transmission of the variety in which plural planet wheels are radially displaceable in orbital motion about an axially opposed pair of axially shiftable sun wheels and within an axially opposed pair of rotationally fixed reaction rings, said planet wheels having constant angular-contact with the wheels and rings of both pairs. An axially fixed pivotal reference between the sun wheels is used for linked connection of the sun wheels such that displacement of the respective sun wheels is always equal in magnitude but in opposite axial directions with respect to the axially fixed reference, thus assuring that the instantaneous radius of planet-wheel orbit between the sun wheel and reaction ring on one axial side of the fixed reference will at all times match the instantaneous radius of planet-wheel orbit between the sun wheel and reaction ring on the other axial side of the fixed reference.

12 Claims, 9 Drawing Figures

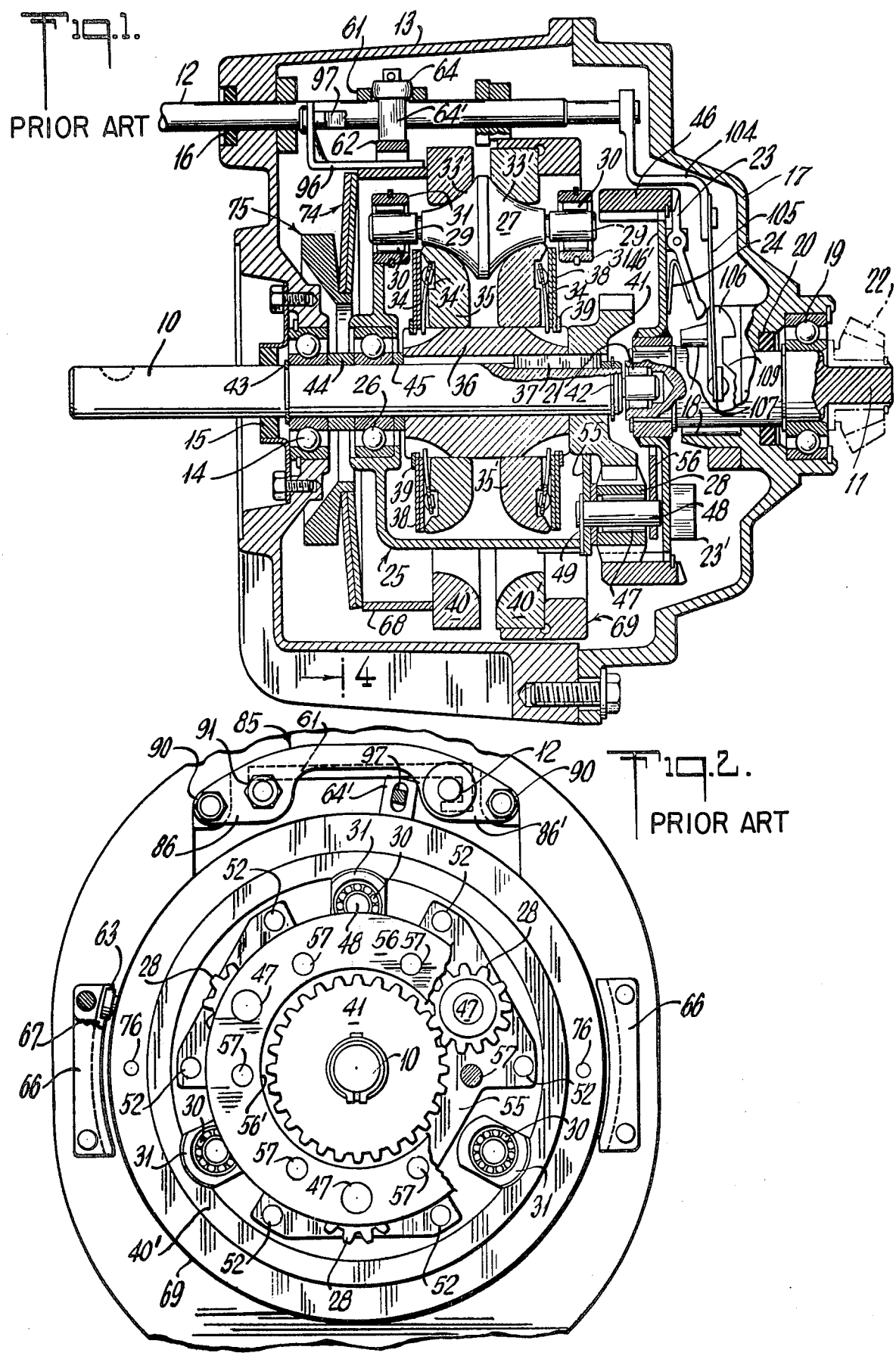

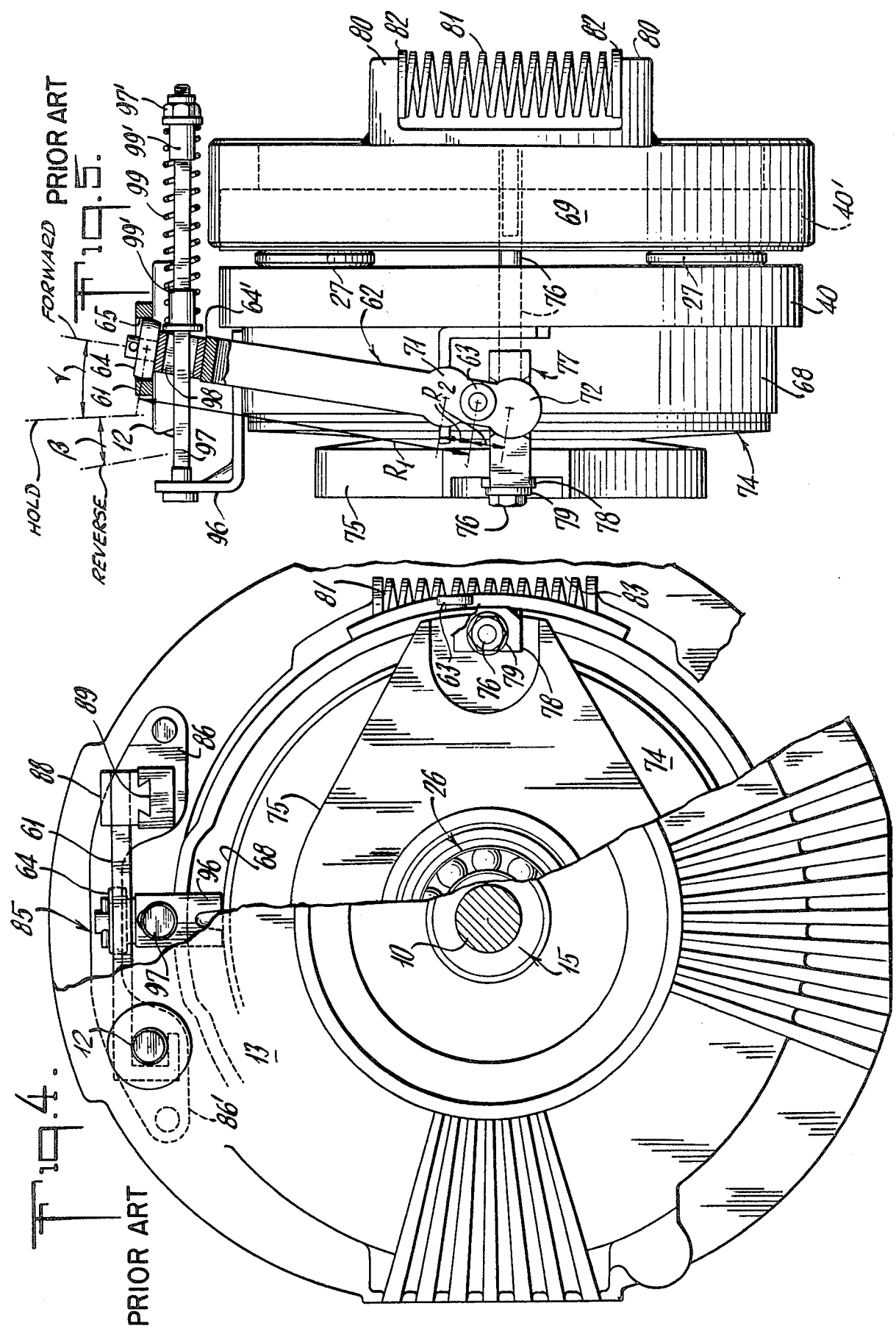

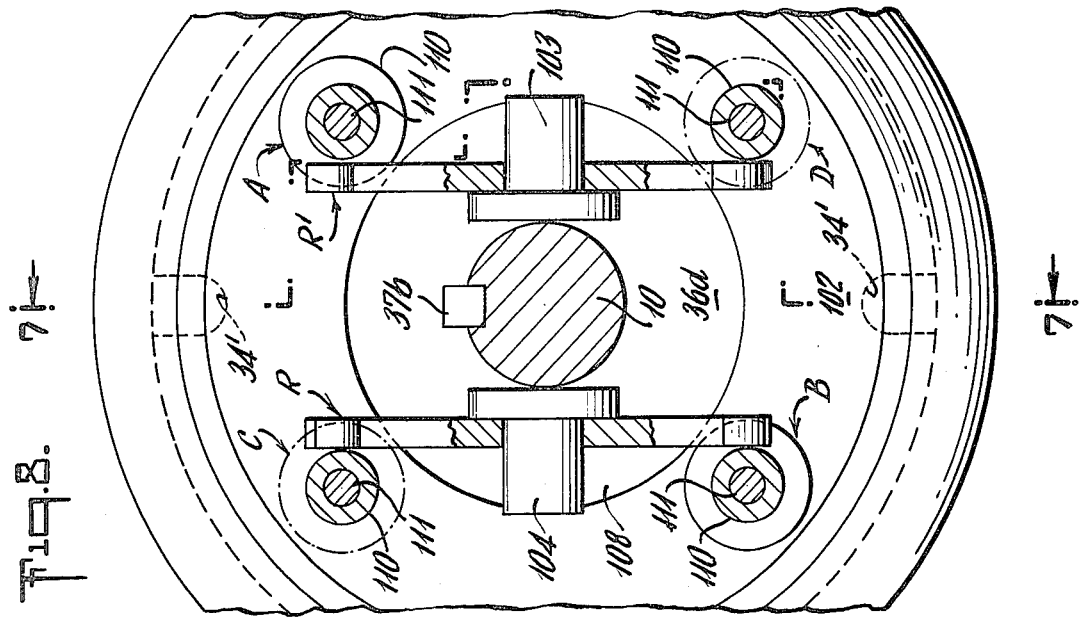
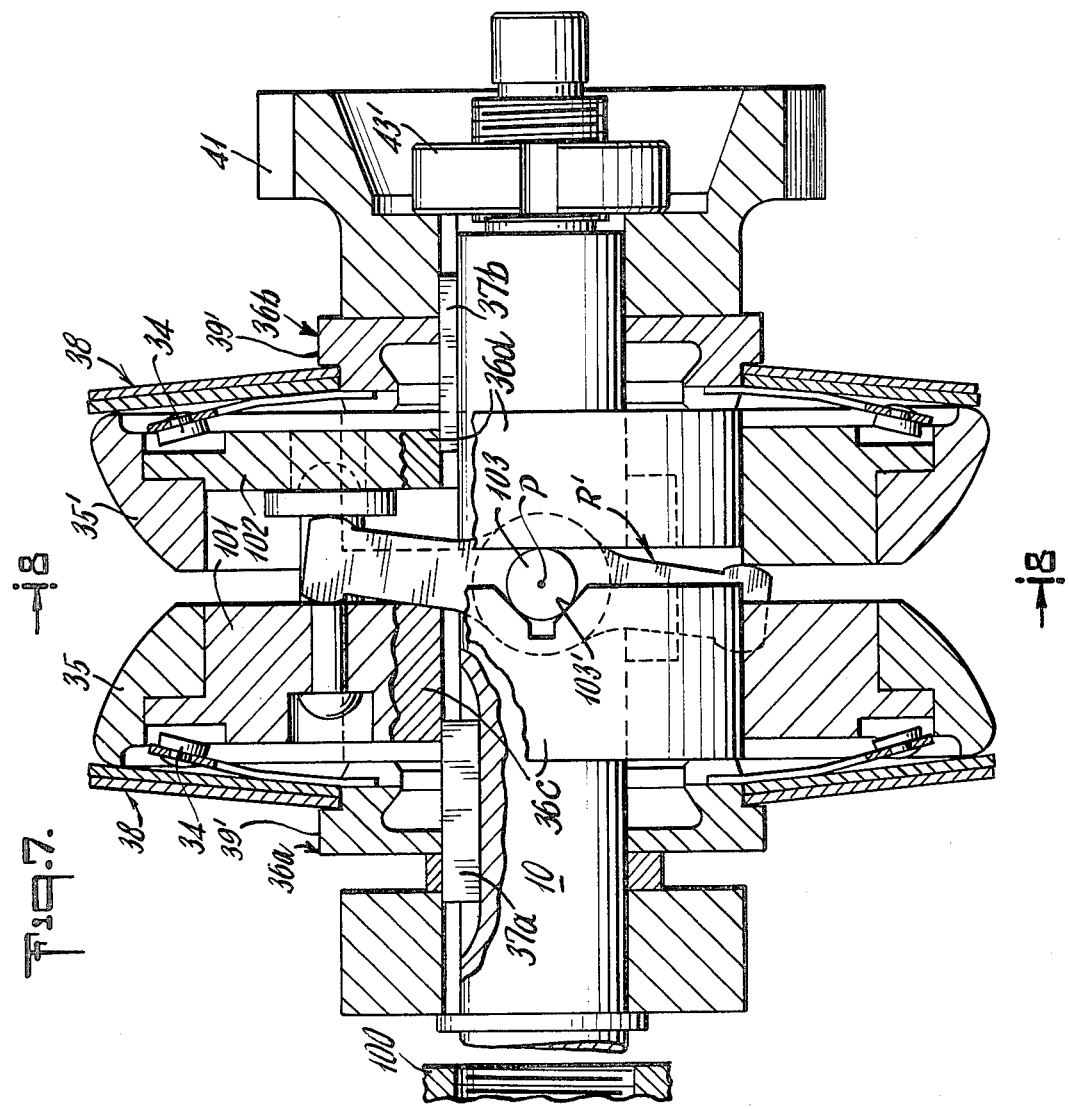

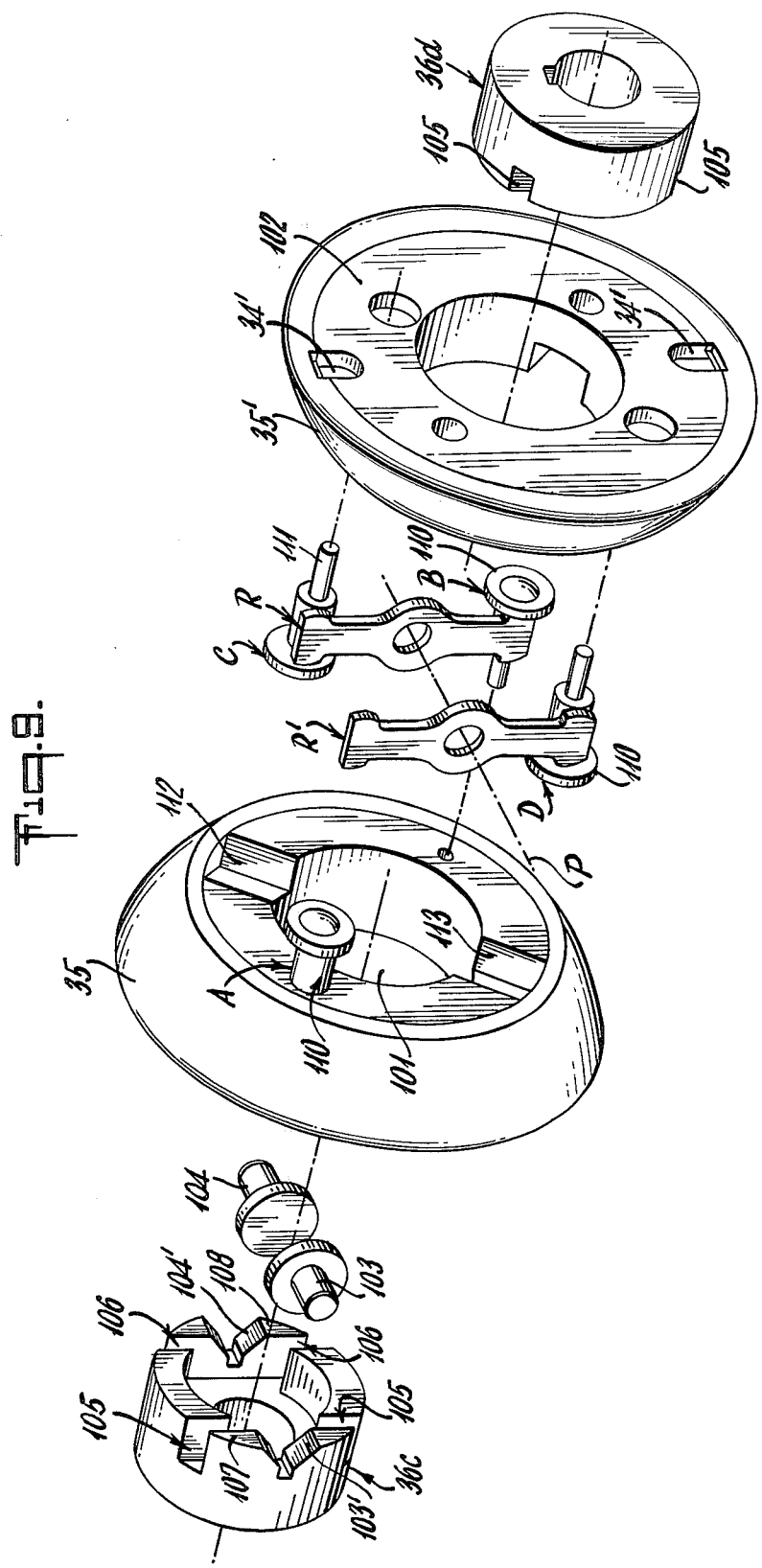

TRACTION-DRIVE TRANSMISSION

This invention relates to traction-drive transmissions of the variety in which plural planet wheels are radially displaceable in orbital motion about an axially opposed pair of axially shiftable sun wheels and within an axially opposed pair of rotationally fixed reaction rings, as of the variety disclosed in McLarty Application Ser. No. 721,938, filed Sept. 10, 1976 (U.S. Pat. No. 4,098,146) and in Dickinson Application Ser. No. 831,934, filed Sept. 9, 1977 the inventions of said applications being owned by Textron Inc., assignee of record of the present application.

In the transmissions of said applications, Belleville springs are relied upon to axially urge the sun wheels together to develop preloaded constant rolling planet-wheel contact between a first sun wheel and a first reaction ring at a first axial zone of planet-wheel orbit, and between a second sun wheel and a second reaction ring at a second axial zone of planet-wheel orbit. Axially opposed angular-contact relations characterize planet-wheel engagements in the respective zones, so that a variable-speed transmission ratio is established between sun-wheel rotation and orbital rotation of the planet wheels, depending upon the relative axial position of the sun wheels.

The said Dickinson application attacks a problem of heat development in such transmissions, particularly under load conditions and when negative-rate Belleville springs are relied upon to preload the sun wheels in thier contact with the respective planet wheels. According to the Dickinson application, the two sun wheels are at all times linked together, via an axially fixed pivotal reference or mount for the link or links, so that the sun wheels are at all times at equal and opposite axial offsets from the fixed reference. However, to achieve balanced application of equalizer forces, the said Dickinson construction requires a slotting of main shaft of the transmission, entailing manufacturing complexity and a weakening of the shaft; additionally, one is precluded from utilizing a hollow shaft in hydraulically controlled transmissions of the character indicated.

It is accordingly an object of the invention to provide an improved traction-drive mechanism of the character indicated.

Another object is to provide such a mechanism characterized by more efficient operation for a given load condition.

A specific object is to provide such a mechanism in which the two opposed sun wheels are more assuredly maintained at equal and opposite axial offsets with respect to an axially fixed reference plane between the reaction rings.

Another specific object is to provide equalizer mechanism to reliably offset inherently unstable operating characteristics of a negative-rate Belleville spring loading mechanism of the character indicated.

A further specific object is to provide a duallink equalizer mechanism which is an improvement over the said Dickinson constructions by avoiding above-noted limitations thereof.

A general object is to meet the above objects with relatively simple structure which does not materially add to the complexity of the overall mechanism but which substantially enhances the efficiency, life and powertransmitting capability of the mechanism.

Other objects and various further features of novelty and invention will be pointed out or will occur to those skilled in the art from a reading of the following specification in conjunction with the accompanying drawings, in which, for better understanding of the background of the invention, FIGS. 1 to 6 are directed to a transmission as provided by said McLarty application, and the remaining figures are directed to modifications of the invention. More specifically, in the drawings:

FIG. 1 is a partly broken-away longitudinal sectional view through a traction-drive transmission of the character indicated;

FIG. 2 is a right-end view of the mechanism of FIG. 1 after its right-end cover and output subassembly have been removed;

FIG. 4 is a left-end view of the mechanism of FIG. 1, with the housing partly broken-away to reveal control parts;

FIG. 5 is a view in side elevation, to show control parts;

FIG. 7 is a fragmentary and partly broken-away longitudinal sectional view through sun-wheel position-equalizing mechanism for use in a portion of the transmission of FIGS. 1 to 6 and representing a preferred embodiment of the invention, the sectioning being taken generally along the alignment 7—7 shown in FIG. 8;

FIG. 8 is a fragmentary sectional view taken at the plane 8—8 of FIG. 7; and

FIG. 9 is an exploded view in perspective of equalizer and sun-wheel parts of FIGS. 7 and 8.

BACKGROUND AND ENVIRONMENT OF THE INVENTION

Figure 3:
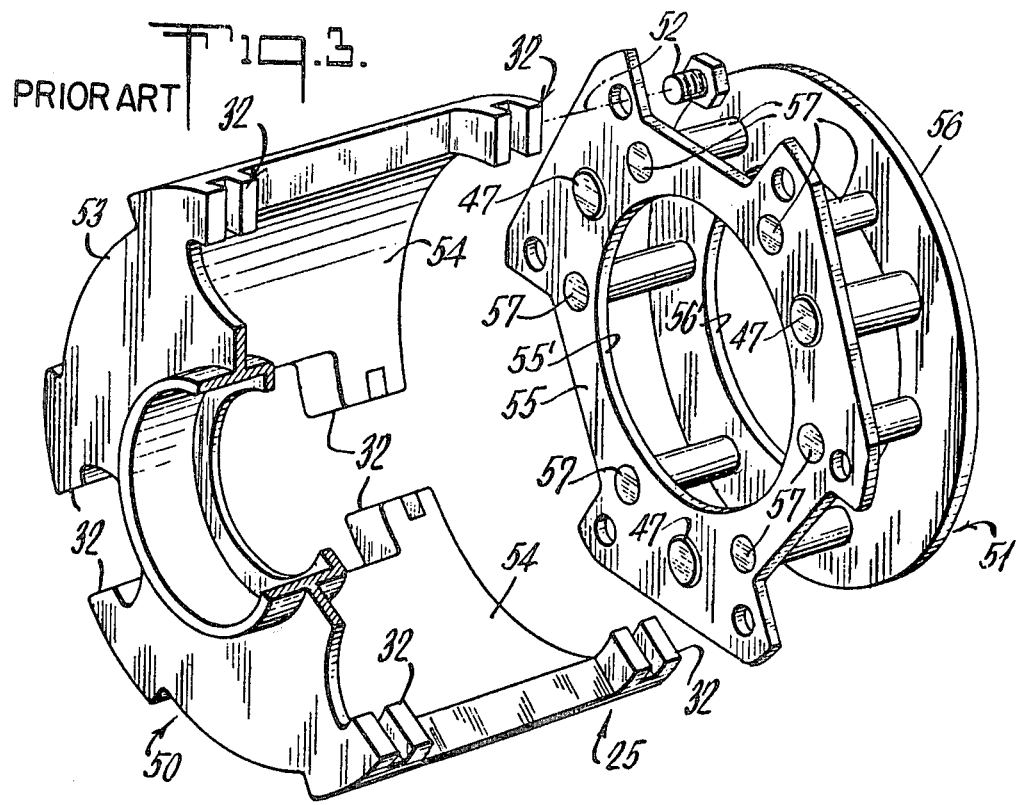
FIG. 3 is an exploded view in perspective, to show the planet-member carrier of the transmission of FIG. 1.

While the heart of the invention pertains to sun-wheel position-equalizer mechanism, as the same is involved in an overall transmission of the character indicated, it is helpful, by way of background, first to discuss a complete transmission of the prior art, the transmission of said McLarty application being taken as illustrative and being here described to the extent considered desirable for a better understanding of the principles and function of the improvements of the present invention. For convenience, and where applicable, the present description utilizes the same reference numerals as in said McLarty application, and reference may be had to said application for a fuller understanding of certain automatic functions and features which do not form part of the present invention.

Referring initially to FIG. 1, a traction drive accepts continuous input rotation of a drive shaft 10, (as from an internal-combustion engine, not shown) and converts the same to forward drive, "hold" (stop), or reverse drive of an output shaft 11, all in accordance with the selective longitudinal positioning of a single control-rod element 12; the same control-rod element 12 is also selectively angularly shiftable to totally disengage the drive to a true "neutral," as for parking or towing conditions. The transmission will be described in the context of illustrative use on a small vehicle such as a lawn or garden tractor equipped as for bulldozer, snowplowing or the like duty, for which the engine may be in the range of 10 to 20 horsepower, but the principles of the invention will be understood to be of greater range of application.

The transmission is contained in a relatively small cup-shaped housing body 13, in the closed end of which the input shaft 10 is supported by an antifriction bearing 14 and is suitably sealed by means 15. The control element 12 is slidably supported through and sealed at 16 to an upper part of the closed end of body 13. The housing is closed by a removable end bell 17 having a central hub in which the output shaft 11 is shown supported by spaced needle and ball bearings 18-19 and is suitably sealed at 20. Shafts 10-11 include telescoping ends, with interposed needle-bearing means 21; and a load is symbolized by an output bevel gear 22.

Within the housing 13, and as part of a complete subassembly carried by the input shaft 10, a single planet-element carrier 25 is rotatably mounted by bearing means 26 on shaft 10; the carrier 25 angularly positions and carries plural planet rollers or wheels 27 and plural planet gears 28 in equal angularly spaced interlaced relation, thereby interconnecting traction-roller and meshing-gear planetary systems, to be described. Preferably, there are three planet rollers 27 and three planet gears 28. Each roller 27 has projecting rotary-support ends 29 riding in needle bearings 30 in slide members 31, and members 31 are in turn guided by radial slots 32 in the carrier 25, to be more fully described in connection with FIG. 3.

Each planet roller 27 is a single rigid element characterized by two like rolling-contact surfaces 33-33' which are truncated-toroidal and concave; surfaces 33-33' are sloped in generally axially-opposite and radially outward orientation, and the surfaces 33-33' may each be the surface of revolution of a circular arc, about an axis outside the circle from which the arc is taken.

The traction-roller planetary system comprises two like sun wheels 35-35' mounted for independent and keyed axial sliding upon a drive sleeve 36, keyed at 37 to the input shaft 10; coupling means in the form of an axially flexible and torsionally stiff plate 34 is shown as the means of establishing a keying connection from sleeve 36 to local key recesses 34' in the sun wheels 35-35'. The outer surfaces of wheels 35-35' are convex and of opposed slope orientation, each being preferably the surface of revolution of a circular arc, of radius less than that of the circular arc defining the respective planet surfaces 33-33'. Opposed Belleville washers or springs 38 are retained on sleeve 36 by snap rings 39 to establish a predetermined axially squeezing preload force of sun wheels 35-35' against the respective planet-surfaces 33-33', thus applying a radially outward force which tends to outwardly displace the planet rollers 27. This displacement and force are opposed by similar axially inward squeezing force applied to two reaction rings 40-40', havng antirotational support in housing 13. Such support and the control and variation of squeezing force action upon reaction rings 40-40' are the subject of some later discussion, in connection with control by rod 12 and by load-responsive downshift mechanism; but the subject is more fully discussed in said pending McLarty application. It suffices here to note that the inwardly facing rolling-contact surfaces of reaction rings 40-40' may, like those of sun wheels 35-35', each be defined as a surface of revolution of circular arc of radius less than that of the circular arc defining the plural planet surfaces 33-33'.

The meshing-gear planetary system comprises a drive or sun gear 41, keyed at 37 to shaft 10 and axially retained by and between snap rings 42-43, along the sleeve 36, the inner rings of bearings 14-26, and axial spacers 44-45 as appropriate. Gear 41 is in constant mesh with the planet gears 28, and the latter are in constant mesh with the inwardly facing teeth of a ring gear 46 carried by a plate 46' that is keyed to the output shaft; for total-drive disengagement, ring gear 46 is freely rotatable on plate 46', and under drive conditions a clutch-dog rocker arm 23 pivotably mounted to plate 46' is spring-urged by means 24 to engage one of a plurality of dog slots in the adjacent end of ring gear 46. Each planet gear 28 is seen in FIGS. 1, 2 and 3 to be needle-bearing mounted at 47 to a support pin 48 that is fixedly retained by means 49 to part of the carrier structure 25.

The carrier 25 is seen in FIG. 3 to be essentially an assembly of a planet-roller retainer casing 50 and a planet-gear cage subassembly 51, bolted together by means 52. Basically, the casting 50 is a continuous plate-like ring at its bearing-supported end 53, and formed with integral arcuate angular segments 54 which extend axially and which are angularly spaced as needed for planet-roller clearance at the respective radially slotted guide locations 32. The planet-gear cage subassembly 51 comprises annular plates 55-56, axially spaced and retained by spacing rivets 57. The plate 55 has three lobe-like projections to enable securely bolted fastening of these projections to the respective body segments 54; the plate 56 is circular and suitably bored at angularly spaced locations for support of the three planet-gear pins 48. As best seen in FIGS. 2 and 3, the aligned central openings 55'-56' of plates 55-56 clear the teeth of gear 41.

Figure 6:
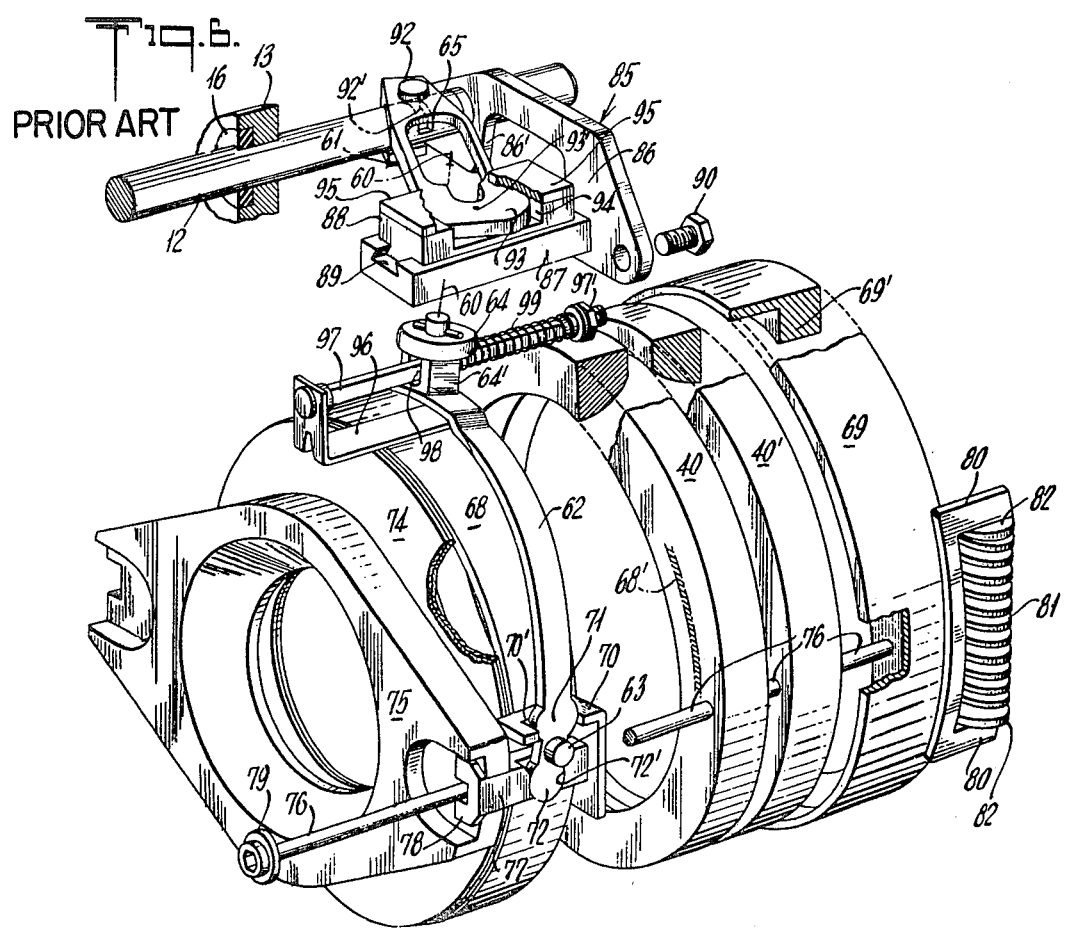
FIG. 6 is an exploded view in perspective of loadresponsive shift-control mechanism of FIG. 1, partly broken-away to reveal an overall parts relationship.

Primary reference is made to FIGS. 4, 5 and 6 in describing mechanism whereby torsionally reactive antirotational support is provided for the reaction rings 40-40' and whereby a selectively applied control positioning of the shift rod 12 is subject to automatic load-responsive correction. Basically, the mechanism comprises (A) a torsionally resilient suspension of an axially preloaded squeezing subassembly, shown in exploded array in the lower part of FIG. 6, and (B) cam-operated means referenced to the housing and associated with shift rod 12, shown as a subassembly in exploded offset (on the alignment 60) from the squeezing subassembly. The shift axis of rod 12 is longitudinal and parallel to the central axis of the planetary systems (i.e., to the axis of reaction rings 40-40'); and selected positioning of rod 12 is translated, via cam means 61 and a cam-following arcuate yoke 62 having pivoted reference at 63 to an axially fixed location in the housing, into corresponding changes in squeeze action. The yoke-pivot roll 63 is one of two, at substantially diametrically opposed locations on the respective arms of yoke 62, and a cam-follower roll 64 on a predestal 64' at the midpoint of yoke 62 tracks shift-rod position via a guide or cam slot 65 in means 61. The frame reference for yoke pivots 63 will be seen in FIG. 2 to be provided by like diametrically opposed blocks 66, secured to housing 13, and each havng an arcuate guide channel 67 in which the yoke pivot 63 is axially captive with a limited freedom for arcuate displacement.

The squeezing subassembly comprises spaced outer sleeve members 68-69 in axial abutment with the respective reaction rings 40-40'; the radius at which sleeve 68 thus abuts reaction ring 40 is suggested by shading between spaced arcuate phantom lines at 68' in FIG. 6, while the other reaction ring 40' is seated within a locating skirt and against a body portion 69' or sleeve 69. Sleeve member 69 includes spaced brackets 70, recessed at 70', to engage and track the instantaneous axial position of a first crank region 71 of each of the yoke arms, while a second crank region 72 of each of the yoke arms is used for similar axial-position tracking by the other sleeve member 69. Since regions 71-72 are on opposite sides of the axis of yoke-pivot means 63, the axial displacements of sleeves 68-69 are equal and opposite, in response to yoke actuation. Stiffly compliant Belleville-spring means 74 is relied upon to apply a squeezing preload of sleeves 68-69 upon rings 40-40'; as shown, the outer radial limit of spring means 74 acts (to the right, in the sense of FIGS. 1, 5 and 6) on sleeve 68, while a diametrically extending beam 75 receives equal and opposite action from the inner limit of spring means 74. Two tie rods 76 connect diametrically opposite ends of beam 75 to corresponding diametrically opposite locations on the sleeve body 69', so that spring action on beam 75 is directly translated into spring action (to the left, in the sense of FIGS. 1, 5 and 6) upon sleeve 69. Each connection of a tie rod 76 to an end of beam 75 is seen in FIG. 6 to involve a tie-rod guide member 77 which comprises a longitudinal channel to receive and locate the associated tie rod 76, the channel body being in turn located in an outwardly slotted end of beam 75; flanges or ears 78 on each member 77 bear against beam 75 at the edges of each end slot thereof, and a washer 79 beneath the head of each tie rod 76 seats against the flanges 78 of the adjacent guide member 77. Finally, a local recess 72' at a longitudinally central region of each guide member 77 coacts with yoke region 72 to respond to a shifted displacement of follower 64.

From the foregoing description of the squeezing subassembly, it will be understood that the instantaneous axial spacing of outer rings 40-40' is always and solely a function of the instantaneous angular position of yoke 62 about its pivot means 63. The force with which such spacing (of rings 40-40') is held will be that which is needed to achieve equilibrium with the instantaneous radially outward displacement force of planet rollers 27. The relatively great mechanical advantage attributable to the predominance of follower-crank radius $R_1$ over actuation-crank radii $R_2$ (see FIG. 5) means a correspondingly reduced reaction force as viewed along the displacement axis of control rod 12, but it is preferred to select the force characteristic of spring means 74 so as to provide a "preload" force in such opposition to the radially outward displacement force of planet rollers 27 that a nominal or "hold" position of yoke 62 is naturally retained. Thus, any adjusted shift of rod 12 from its "hold" position will only involve differential actuation of the respective ends of the squeezing subassembly, so that control-force magnitudes can be kept at relatively very low levels, involving minimum reaction upon the housing or upon the control mechanism.

A description of the squeezing subassembly is completed by noting that both tie rods 76 pass through aligned locating apertures in each of the reaction rings 40-40' and in the radial-plane wall of each of the brackets 70, thus assuring angularly keyed integrity of all parts of the subassembly. Additionally, the sleeve 69 is provided with diametrically opposed pairs of angularly spaced arms 80; between each pair of arms 80, a compressionally preloaded spring 81 is seated on pads or washers 82. A substantial fraction of each pad 82 projects radially outside arms 80 for torsionally resilient reacting engagement with adjacent side-wall regions of diametrically opposed local recesses 83 in housing member 17; these recesses may be seen in FIG. 4, but springs 81 have been omitted from FIG. 2 in order to permit viewing and identification of the guide blocks 66 for yoke-pivot action (already described).

The upper non-rotatable control portion of FIG. 6 comprises a mounting plate 85 of sheet metal and establishes a guide for rod 12 with enlarged outer ends 86-86', to permit secure bolting, by means 90, to the interior of housing 13 (see also FIG. 2). Rod 12 has a circumferential groove for longitudinal-position tracking by the forked end (92') of a pin 92 near the adjacent end member 61. A bracket arm 87 is secured to and projects from the mounting-plate enlargement 86, providing extended frame reference for a slide block 88; block 88 has a dovetail-guide (89) relation to arm 87, being adjustably positionable through selected setting of a lead screw as suggested at 91 in FIG. 2. The unpinned end 93 of control plate 61 is arcuately contoured for guidance between spaced shoulders 94 of a transverse groove in block 88, and capping plates 95 on the shouldered regions of block 88 sufficiently overlap the groove for captive retention of end 93 of the control member 61. Thus, control member 61 and its cam 65 span a range of angular positions of follower 64 about shafts 10-11, and throughout this range, cam-follower roll 64 is in constant tracking engagement with the cam 65.

An axial shifting of rod 12 will cause pin 92 to pivotally displace cam plate 61 about an instantaneous center 93' of the rounded end 93 of plate 61, at a frame-reference longitudinal location determined by the setting at 91, for block 88 in its guide 89. Such displacement of plate 61 will change the instantaneous location of cam-follower (64) engagement along cam 65, thereby imparting a rotational displacement of yoke 62 about its pivot means 63, and thus directly changing the axial spacing and, therefore, the squeezing action of reaction rings 40-40', as well as the preloaded condition of spring means 74.

As already noted, each positional adjustment of the spacing of reaction wheels 40-40' is accompanied by a positional shift of the planet rollers 27, in radial direction and extent, against the compressional preload of the sun wheels 35-35' (due to the combined effects of springs 38). The spring means 74 merely relieves the net force encountered at control rod 12; the characteristic and preload level of spring means 74 are selected to substantially match or offset the instantaneous axial-force reaction from the preloading springs 38. In terms of control-rod (12) positioning, the net traction-drive ratio will always depend primarily upon (a) the current positional setting of control rod 12 and (b) such corrective modification of the pivoted angle of yoke 62 as is achieved for such setting by reason of load-reacting influence upon the antirotational springs 81 and the cam means 65-64. For the present illustration in which forward, stop ("hold") and reverse drives are selectively available, such availability of "hold" (zero output speed) applies under load as well as under no-load conditions; the control-rod position necessary to achieve "hold" will always be the same, but the cam follower 64 will assume various positions along the straight length of cam 65, depending upon the load condition. In any event, however, the above-noted spring reaction, between inner-spring means 38 and the balancing or offsetting effect of the outer-spring means 74, will always be operative upon the mechanism; and a preference is stated for the use of so-called Belleville springs at 38-74 because they have the property of exhibiting a negative-rate coefficient for axial deflections beyond that deflection at which their positive rate coefficient ends, it being preferred that such springs are under such preloaded condition as to assure operation at all times in the negative-rate portion of their respective coefficients, all as discussed in greater detail in said McLarty application.

For many applications, the mechanism as described will be perfectly satisfactory, but FIGS. 5 and 6 additionally illustrate a feature to provide stronger resilient force to urge the shift yoke 62 and its follower 64 away from the extreme-forward displacement positions. For such action, a mounting bracket 96 is fixed to sleeve 68 and retains the headed end of an elongate square-section guide rod 97, keyed against rotation by opposed walls of a radially slotted opening 98 in pedestal 64'; and a compression spring 99 on rod 97 is preloaded against pedestal 64', between bushings 99' and in accordance with preload adjustment of threaded means 97'. As yoke 62 is shifted to the right (forward speed selection), pedestal 64' is shifted to further compress spring 99, with the result that spring 99 will tend to return yoke 62 to the neutral or to a less-than-full forward speed position.

Preferred Embodiment of the Invention

Thus far, the description has been directed to an overall transmission, in order that the present embodiment of the invention may be better understood as an improved alternative for certain components of the overall transmission. In this connection, FIGS. 7 to 9 are directed to preferred equalizer mechanism, when embodied in such a transmission; and in FIG. 7, various components will be recognized as having already when described in conjunction with the same or similar reference numbers.

Briefly, the invention provides axially fixed diametrically aligned reference points at a predetermined central location P along the axis of drive shaft 10 and between the opposed sun rings 35-35' and their associated preloaded Belleville springs 38, and this diametrical alignment establishes the pivot axis for each of two equalizer levers or rocker arms R-R' which are utilized to assure that sun rings 35-35' will at all times be positioned at equal and opposite axial offsets from the reference location P.

To accomplish the indicated relationship in the form of FIGS. 7 to 9, the opposed springs 38 are independently mounted to and retained by flanges 39' of ring members 36a-36b which are in clamped abutment with the axially outer ends of adjacent sleeve members 36c-36d, the clamp being symbolized at the left end of FIG. 7 by nut means 100 on shaft 10, and at the right end by nut means 43' set against the sun gear 41. As with sleeve 36 of FIG. 1, both sleeves 36c and 36d of FIG. 7 (and both associated ring members 36a-36b) are keyed to shaft 10, at 37a-37b. Between the flange or shoulder mounts for springs 38, sleeve members 36c-36d are reduced and cylindrical to provide for guided axial sliding action of the respective sun wheels 35-35', and separate support-ring or bushing members 101-102 are relied upon to mount the individual sun wheels 35-35' and to ride the cylindrical guide surfaces of sleeves 36c-36d.

As best seen in FIG. 9, the sleeves 36c-36d are axially opposed substantial duplicates of each other. When in their axially clamped relation, they cooperate to fixedly position lever-pivot means in the form of headed pins 103-104 on the diametrical alignment P. To this end, one of the sleeves (e.g., sleeve 36c) has aligned pivot-mounting formations in the form of V-grooves 103'-104', sized for aligning tangential contact with the cylindrical shanks of pins 103-104, when the corresponding flat (i.e., ungrooved) adjacent end-face region of the other sleeve 36d is axially clamped to pins 103-104, as most clearly shown in FIG. 7.

It will be noted that each of sleeves 36c-36d is relatively thick, radially, and that this thickness substantially exceeds the thickness of each of the flat equalizer levers R-R'. The adjacent ends of these sleeves have matched chordally extending grooves 105-106 providing lever-supporting wall formations and determining spaced parallel planes of lever support and of limited pivotal articulation, such grooves being at radial offset $\Delta R$ from the sleeve bore and therefore from the respective adjacent side regions of the input shaft 10; each of the grooves 105 (106) thus defines, with the adjacent cylindrically arcuate outer-surface region of each sleeve, a substantial segment 107 (108), adequate to the described purpose of clamped retention of pins 103-104. The axial thickness of the head of each of the pivot pins 103-104 and the thickness of the applicable lever will be seen to be well accommodated in the offset region or space $\Delta R$, and the location of pivot heads radially within their associated levers will be seen to inherently assure against loss of equalizer pivots regardless of degrading clamp action and in spite of centrifugal forces attributable to input-shaft rotation.

In accordance with a feature of the invention, the opposite ends of each of the levers R-R' are effectively connected to a different one of the sun wheels, the lever connections to each sun wheel being at substantially diametrically opposed locations with respect to the axis of each sun wheel, thereby enhancing symmetry of equalizer action about the input-shaft axis. To this end, in the form shown, first and second flanged bushings 110 are secured as by rivet-means 111 at diametrically opposed locations A-B on the axially inner face of the bushing 101 which mounts sun wheel 35, while third and fourth such bushings 110 are similarly secured at diametrically opposed locations C-D on the axially inner face of the bushing 102 which mounts the other sun wheel 35'; and the diametrical alignment A-B is at substantial angular offset from the diametrical alignment C-D, to permit adjacent lever-end connections in the spaced parallel planes of lever articulation, said planes being on opposite sides of the input shaft 10. For clarity in FIG. 9, the bushings 110 at A-B and the bushings 110 at C-D are shown in exploded relation to their ultimately mounted positions; also for clarity, the lever R' and its D connection are shown in phantom outline.

Thus, the rounded upper end of lever R is effectively connected at C to the right-hand sun wheel 35' while its rounded lower end is effectively connected at B to the left-hand sun wheel 35. And at the same time, the rounded upper end of lever R' is effectively connected at A to the left-hand sun wheel 35 while its rounded lower end is effectively connected at D to the right-hand sun wheel 35'. In both cases, the equal and opposite axial-offset connections are provided with respect to an axially-fixed stabilizing reference, afforded by pivot pins 103-104 that are clamped to the single transverse reference alignment P.

It will be seen that the described dual-lever position-equalizing mechanism provides a simple but highly effective component at the heart of traction-drive systems of the character indicated, and meeting all stated objects. The linkage represented by rocker-arm interconnection of sun rings with respect to a fixed axial reference is found to equalize spring or other forms of loading within the overall system, and to provide greater efficiency of power transmission, while leaving the input shaft available for accommodation of other functions, such as conduit means in a fluid-pressure operated system; less heat is generated because the improved mechanism provides greater assurance that sun-ring radii of roller contact will always be the same at any given time so that reaction-ring radii of roller contact may also be the same at any given time. The invention is particularly advantageous in circumstances wherein preloading Belleville springs are in sufficiently preloaded displacement to enable operation in the negative-rate portion of their characteristic, it being noted that negative-rate springs in opposition have been found to be relatively unstable. The invention provides sufficient rigidity of axial reference to overcome the noted instability tendency, and the two inner races (sun rings) are always forced to move in symmetry about the axially fixed pivot point.

Aside from the foregoing, the structure involved in achieving sun-ring positional equalizing is of elemental simplicity and therefore relatively low-cost in nature. Specifically, the flanged bushings 110 are used in duplicate, at each of the lever-connecting locations A-B-C-D, requiring but a simple rivet-heading operation to complete their assembly to their respective support members 101-102, the rear end of each rivet 111 being accommodated in a counterbore in its support member, as clearly visible for the exposed axially outer end of support member 102 in FIG. 9. The support members 101-102 are again duplicates of each other, providing flange-located circumferentially continuous mounting of their respective sun wheels 35-35', and having their inner end faces milled with a single diametrically extending groove-forming pass, to generate local recesses 112-113 into which the flanged end of a bushing 110 may enter when the sun wheels 35-35' are most close to each other. And the machining of sleeves 36c and 36d involves no more than well-understood turning and straight-milling operations.

While the invention has been described in detail for the preferred form shown, it will be understood that modifications may be made without departing from the scope of the invention.

What is claimed is:

1. In a traction-drive transmission, comprising a housing, an input shaft journaled for rotation in said housing, two axially spaced sun wheels having keyed longitudinally relatively slidable support on said shaft, equalizer-link means connecting said sun wheels for equal and opposite axially displaced positioning with respect to an axially-fixed location therebetween, means carried by said shaft and axially pre-loading said sun wheels in the direction of relative axial approach to each other, plural like planet wheels axially interposed between and in rolling contact with said sun wheels, a planet-member carrier supported for rotation about the shaft axis and including spaced radial guides positioning said planet wheels on angularly spaced axes offset from the shaft axis and in said planet-member carrier, whereby each of said planet wheels may have at least a degree of generally radial freedom at its guided angular position with respect to said carrier, two axially movable reaction rings having anti-rotational support in said housing and in constant rolling contact with said planet wheels, an output shaft journaled for rotation in said housing and coupled to said planet-member carrier, and control means for varying the relative axial spacing of said reaction rings; the improvement in which said shaft support of said sun wheels includes two separate and diametrically aligned pivot means carried for rotation with said input shaft and external to and on opposite sides of said input shaft, the pivot alignment being normal to the input-shaft axis, said equalizer-link means comprising separate like levers each of which is centrally pivoted to a different one of said pivot means, whereby said levers pivot independently in spaced parallel planes which are on opposite sides of the input shaft, means connecting the opposite ends of each of said levers to a different one of said sun wheels, the lever connections to each sun wheel being at substantially diametrically opposed locations with respect to the axis of each sun wheel, and the diametrical alignment of lever connections to said respective sun wheels being at substantial angular offset from each other.

2. The transmission of claim 1 in which sleeve means on said input shaft provides independent axially slidable support for said sun wheels, said pivot means being mounted to said sleeve means, and means on said input shaft clamping said sleeve means thereto with said pivot means centrally intermediate said sun wheels.

3. The transmission of claim 2, wherein said sleeve means is keyed to said input shaft.

4. The transmission of claim 1, in which first and second axially adjacent sleeves are carried by said input shaft and each sleeve provides independent axially slidable support for a different one of said sun wheels, pivot-mounting formations on one of said sleeves at the region of sleeve-to-sleeve adjacency, and means on said input shaft axially clamping said sleeves to each other via said pivot means and retaining the diametrically aligned relation of said pivot means.

5. The transmission of claim 4, in which said levers are substantially flat and said sleeves are of radial thickness substantially exceeding the thickness of said levers, the adjacent ends of said sleeves having matched chordally extending lever-supporting wall formations and determining spaced parallel planes of lever support and articulation in radial clearance with the respective opposite sides of the input shaft, whereby said wall formations define diametrically arcuate segments radially outside said wall formations, said pivot-mounting formations being in said arcuate segments of one of said sleeves.

6. The transmission of claim 5, in which each pivot means comprises a headed pin mounted to said pivot-mounting formations and extending radially inward of one of said segments with the headed end of the pin received in the radial clearance between the associated lever and said input shaft.

7. The transmission of claim 1, wherein said preloading means includes Belleville-washer means stressed for operation in the negative-rate region of the characteristic thereof.

8. The transmission of claim 1, in which said output shaft is journaled for rotation on the axis of said input shaft, and in which the coupling thereof to said carrier comprises a sun gear keyed to said input shaft, a ring gear keyed to said output shaft, and planet-gear means pivotally mounted to said carrier and meshing with said sun and ring gears.

9. In a traction-drive transmission, comprising a housing, an input shaft journaled for rotation in said housing, two axially spaced sun wheels having keyed longitudinally relatively slidable support on said shaft, equalizer-link means connecting said sun wheels for equal and opposite axially displaced positioning with respect to an axially-fixed location therebetween, means carried by said shaft and axially pre-loading said sun wheels in the direction of relative axial approach to each other, plural like planet wheels axially interposed between and in rolling contact with said sun wheels, a planetmember carrier supported for rotation about the shaft axis and including spaced radial guides positioning said planet wheels on annularly spaced axes offset from the shaft axis and in said planet-member carrier, whereby each of said planet wheels may have at least a degree of generally radial freedom at its guided angular position with respect to said carrier, two axially movable reaction rings having anti-rotational support in said housing and in constant rolling contact with said planet wheels, an output shaft journaled for rotation in said housing and coupled to said planet-member carrier, and control means for varying the relative axial spacing of said reaction rings; the improvement in which the shaft support of said sun wheels includes sleeve means on said input shaft and providing independent axially slidable support for said sun wheels, two separate and diametrically aligned pivot means mounted to said sleeve means on opposite sides of said input shaft, the pivot alignment being normal to the input-shaft axis, means on said input shaft clamping said sleeve means thereto with said pivot means centrally intermediate said sun wheels, said equalizer-link means comprising separate like substantially flat levers each of which is centrally pivoted to a different one of said pivot means, whereby said levers pivot independently in spaced parallel planes which are on opposite sides of the input shaft, means connecting the opposite ends of each of said levers to a different one of said sun wheels, the lever connections to each sun wheel being at substantially diametrically opposed locations with respect to the axis of each sun wheel, said sleeve means being of radial thickness substantially exceeding the thickness of said levers, spaced parallel chordally extending lever-supporting wall formations in said sleeve means and determining spaced parallel planes of lever support and articulation in radial clearance with the respective opposite sides of the input shaft whereby said wall formations define diametrically opposed arcuate segments radially outside said wall formations, each pivot means comprising a headed pin mounted to and extending radially inward of one of said segments with the headed end of the pin received in the radial clearance between the associated lever and said input shaft.

10. The transmission of claim 9, in which said pivot-mounting formations comprise V-groove formations on a diametrical alignment and facing axially toward the other sleeve, said V-groove formations being sufficiently shallow that each pivot means is axially compressed into diametrical alignment with the other pivot means by the axially clamping action of said other sleeve driving the respective pivot means into firmly seated relation with the respective V-grooves.

11. The transmission of claim 10, in which the sleeve-abutment surface of the other sleeve is flat at the region of pivot-means engagement.

12. The transmission of claim 9, in which said sleeve means comprises first and second axially adjacent sleeves carried by said input shaft, each sleeve providing independent axially slidable support for a different one of said sun wheels, pivot-mounting formations on one of said sleeves at the region of sleeve-to-sleeve abutment, and means on said input shaft axially clamping said sleeves to each other via said pivot means and retaining the diametrically aligned relation of said pivot means.

* * * * *